United States Patent [19]

Tejima et al.

[11] Patent Number: 5,005,968
[45] Date of Patent: Apr. 9, 1991

[54] CONTRAST DECREASING APPARATUS IN IMAGE FORMING OPTICAL SYSTEM

[75] Inventors: Yasuyuki Tejima; Ryota Ogawa; Makoto Sato, all of Tokyo, Japan

[73] Assignee: Asahi Kogaku Kogyo Kabushiki Kaisha, Tokyo, Japan

[21] Appl. No.: 400,015

[22] Filed: Aug. 29, 1989

[30] Foreign Application Priority Data

Aug. 31, 1988 [JP] Japan ................................ 63-217334

[51] Int. Cl.$^5$ ..................... G03B 21/00; G02B 13/18; H04N 5/72
[52] U.S. Cl. .................................... 353/122; 353/38; 350/451; 350/436; 358/251
[58] Field of Search .................... 353/81, 31, 122, 38; 358/230, 231, 236, 241, 251; 340/716, 717, 768, 766, 705; 350/436, 424, 286, 451, 452

[56] References Cited

U.S. PATENT DOCUMENTS

| | | | |
|---|---|---|---|
| 531,994 | 1/1895 | Gathmann | 350/451 |
| 591,466 | 10/1897 | Gathmann | 350/451 |
| 1,821,623 | 9/1931 | Emmerich | 353/81 |
| 2,443,722 | 6/1948 | Carlson | 353/81 |
| 3,471,229 | 10/1969 | Boon | 353/81 |
| 3,517,200 | 6/1970 | Kalman | 358/230 |
| 3,847,471 | 11/1974 | Lindner | 353/81 |
| 3,886,310 | 5/1975 | Goldberg et al. | 358/231 |
| 4,559,480 | 12/1988 | Nobs | 340/766 |
| 4,581,612 | 4/1986 | Jones | 340/766 |
| 4,587,553 | 5/1986 | Watanabe et al. | 358/230 |
| 4,646,143 | 2/1987 | Watanabe et al. | 358/251 |
| 4,676,593 | 6/1987 | Adachi et al. | |
| 4,723,119 | 2/1988 | Morimoto | 340/766 |
| 4,761,641 | 8/1988 | Schreiber | 340/717 |
| 4,769,915 | 9/1988 | Nelson | 353/25 |
| 4,804,253 | 2/1989 | Stewart | 358/251 |
| 4,853,592 | 8/1989 | Strathman | 340/768 |

FOREIGN PATENT DOCUMENTS

| | | |
|---|---|---|
| 51-7381 | 3/1976 | Japan. |
| 59-7325 | 1/1984 | Japan. |
| 59-7326 | 1/1984 | Japan. |
| 59-124301 | 7/1984 | Japan. |
| 0263928 | 12/1985 | Japan ................. 350/451 |
| 61-254924 | 11/1986 | Japan. |
| 1491064 | 11/1977 | United Kingdom ............... 350/451 |

*Primary Examiner*—William A. Cuchlinski, Jr.
*Assistant Examiner*—William C. Dowling
*Attorney, Agent, or Firm*—Sandler, Greenblum & Bernstein

[57] ABSTRACT

A contrast decreasing apparatus including an image forming device having arrays of fine picture elements which are provided between non-emission masks located in a matrix arrangement, a projecting optical device which projects the images formed by the image forming device, and an image dividing and shifting device in the projecting optical device for dividing the images of the respective picture elements or a whole image formed by the picture elements into a plurality of images in different directions.

24 Claims, 14 Drawing Sheets

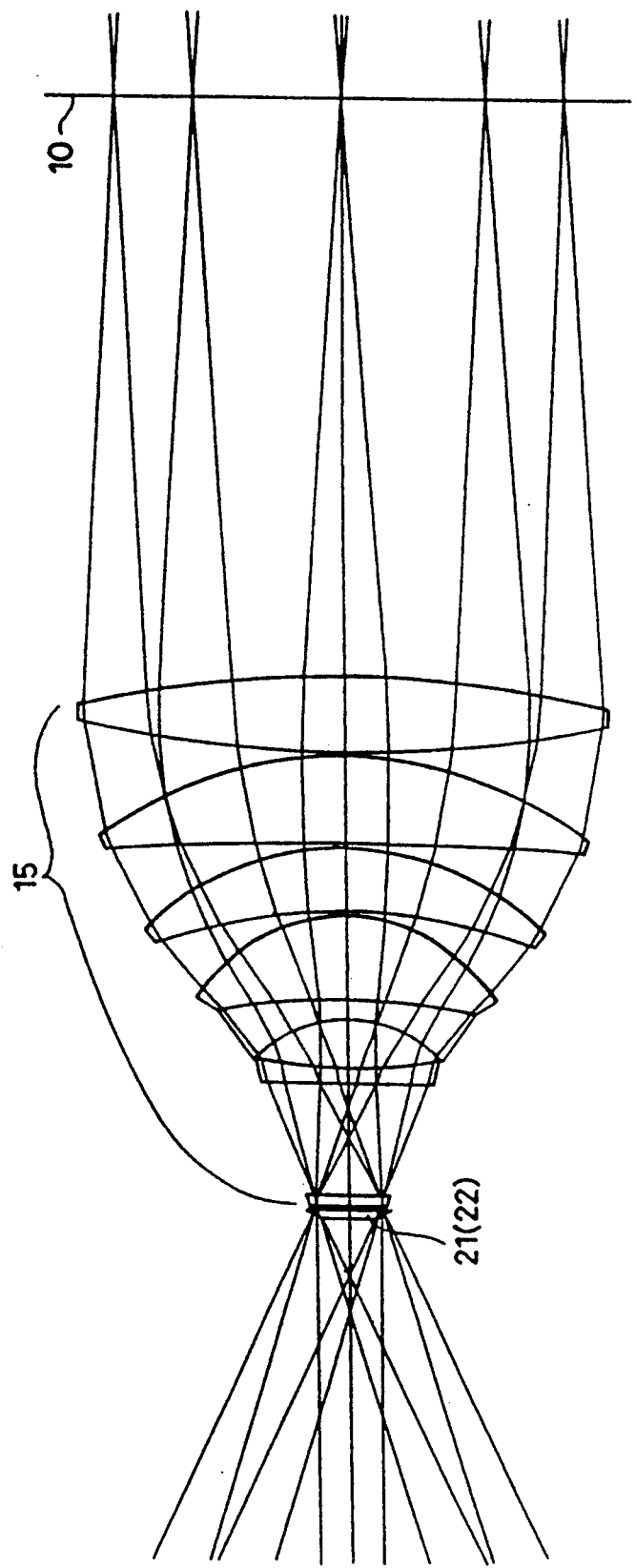

Fig. 8 shift for 4 directions
a = 0  4b = 100

| 4b | 2b | 4b | 4b | 2b | 4b |
|----|----|----|----|----|----|
| 2b | b  | 2b | 2b | b  | 2b |
| 4b | 2b | 4b | 4b | 2b | 4b |
| 4b | 2b | 4b | 4b | 2b | 4b |
| 4b | 2b | 4b | 4b | 2b | 4b |
| 2b | b  | 2b | 2b | b  | 2b |
| 4b | 2b | 4b | 4b | 2b | 4b |

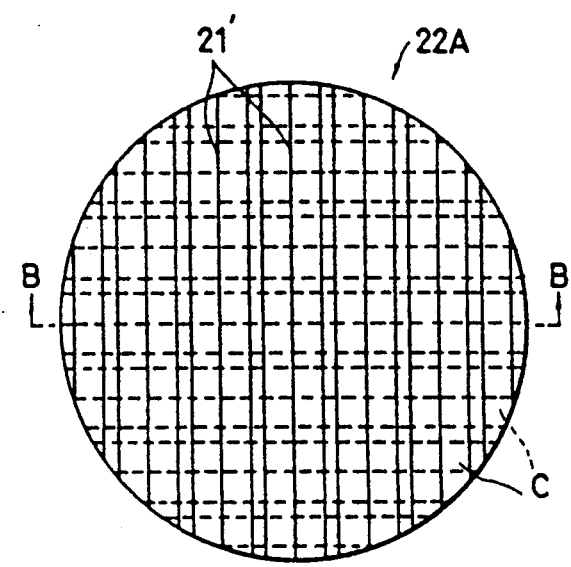
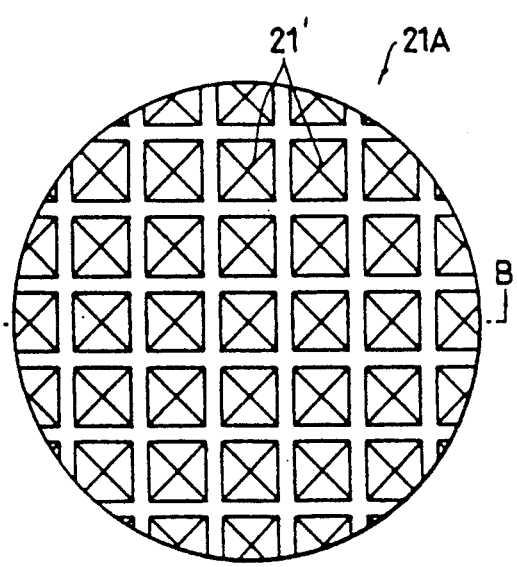
Fig. 14 A
Fig. 13 A
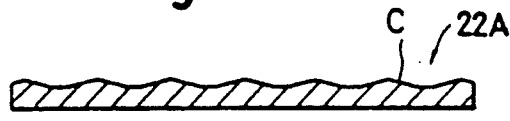
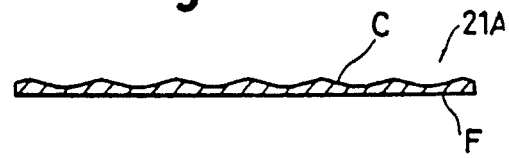
Fig. 14B
Fig. 13B

CONTRAST DECREASING APPARATUS IN IMAGE FORMING OPTICAL SYSTEM

BACKGROUND OF THE INVENTION

1. Field of the Invention

The present invention relates to an image forming optical system having arrays of fine picture elements and non-emission portions (masks) located between the picture elements which do not contribute to the formation of an image, and more precisely to an apparatus for decreasing contrast of the non-emission portions (masks).

2. Description of the Related Art

In a CRT, liquid crystal color TV or endoscope, an image is formed by arrays of fine picture elements. For instance, in a liquid crystal color TV, non-emissin portions (masks), which are usually black and which do not contribute to formation of an image, are located between the picture element arrays in order to increase the overall contrast. In an image formed by fine picture element arrays in optical fibers, black masks (light intercepting covers) are provided in spaces between the respective fibers. However, since such non-emission portions (masks) are provided microscopically in the form of black and white lines which appear between the fine picture elements projected or viewed through an ocula optical system, the lines tend to interfere with an image, particularly a white or other bright image. The tendency is more noticeable in a recent image forming optical system having arrays of finer picture elements, in comparison with a conventional image forming optical system in which the fine picture elements are sufficiently larger than the masks. Namely, the number of people who feel that the masks on the image are offensive is increasing. In the liquid crystal system, since a switching mechanism or the like is absolutely necessary, the reduction of the line width of the masks is restricted. On the other hand, picture elements must be made smaller.

Optical fibers have the same tendency, since the space occupied by the masks in the spaces between associated optical fibers relatively becomes large as the diameter of the optical fiber having a circular cross section decreases.

It is known to defocus an image in order to decrease the contrast of the masks. This is useful to some extent, but it is very difficult to uniformly defocus a whole image, similarly the difficulty in effecting the uniform elimination of aberration of an entire image. For example, if proper defocusing is peformed at the center portion of the image, either excess or insufficient defocus takes place at the circumferential portion of the image.

In a projecting optical system having a liquid crystal, it is possible to reduce the contrast of the masks to some extent by increasing the distance between the liquid crystal panel and the mask. This is, however, goes contrary to the need for the reduction in size and thickness of optical system.

SUMMARY OF THE INVENTION

The primary object of the present invention is to provide an apparatus which can decrease the contrast of the masks between fine picture elements without using the defocusing method as mentioned above.

The basic concept of the present invention is that the contrast of the mask can be reduced if an image of the mask is divided into images (divided images) which are shifted in different directions to be projected or viewed.

If an image forming optical system in which an image is formed by arrays of small picture elements and which has non-emission portions located between the picture elements which do not contribute to the formation of an image, according to the present invention, the improvement comprises means for dividing images of respective picture elements, on the whole image formed by the picture elements, into more than one image; and for shifting the divided images by a distance, within a size of one picture element to be projected, onto a projection plane of an image, or the image plane of the aerial image.

The image forming optical system can be either a projecting optical system in which a transmitted image of the picture element array is projected onto the projection plane through a projecting optical system or an aerial image viewing system, in which an aerial image of the fine picture elements is viewed through an ocular optical system.

The dividing and shifting means can be composed, for example, of a dividing and shifting filter which has a plurality of prisms and which is preferably located at a diaphragm position of the projecting optical system, or within the vicinity thereof, in order to make the apparatus of the invention smaller.

The amount of shift of the image by the dividing and shifting means is smaller than twice the line width of the masks, and is preferably substantially equal to the line width.

The dividing and shifting means divides the image into two or more images. In case of division into two images, the masks to reduce the contrast are located only along one of the lengthwise and crosswise arrays. In this case, for example, the masks located along one of the lenghthwise and crosswise arrays are thin; and, accordingly no decrease of contrast is necessary, and only contrast of the masks along the other lengthwise or crosswise array needs to be decreased.

If the dividing and shifting means is composed of liquid crystals in which the fine picture elements are located between the lengthwise direction masks and the crosswise direction masks, the image is preferably shifted in at least four directions at about 45° angles with respect to the lengthwise and crosswise directions. In this case, the dividing and shifting means can be either of a type in which the image is divided into five images, four of which are shifted in directions forming about 45° angles with respect to the lengthwise and crosswise directions of the masks and the other one being a center image which is not shifted, or of a type in which the image is divided into four images which are shifted only in directions forming about 45° angles with respect to the lengthwise and crosswise directions of the masks.

Upon viewing the image formed by the fine picture element arrays through the viewing optical system in, for example, an endoscope, a dividing and shifting means is preferably provided in the viewing optical system to divide an image of each of the fine picture elements or a whole image formed by the picture elements into more than two images, thereby shifting the divided images by a predetermined distance within the size of the fine picture elements.

BRIEF DESCRIPTION OF THE DRAWINGS

The invention wil be described below in detail with reference to the accompanying drawings, in which:

FIG. 4 is an explanatory view of light paths of a projecting optical system showing an arrangement of dividing and shifting filter;

FIG. 8 is a plan view showing the distribution of light quantity of a dividing and shifting filter as shown in FIGS. 3A and 3B;

FIGS. 11A, 12A, 13A, 14A and 15A are plan views of different embodiments of a compound dividing and shifting filter, respectively;

FIGS. 11B, 12B, 13B, 14B and 15B are sectional views taken along the line B—B in FIGS. 11A, 12A, 13A, 14A and 15A, respectively;

DESCRIPTION OF PREFERRED EMBODIMENTS

Figure 1:
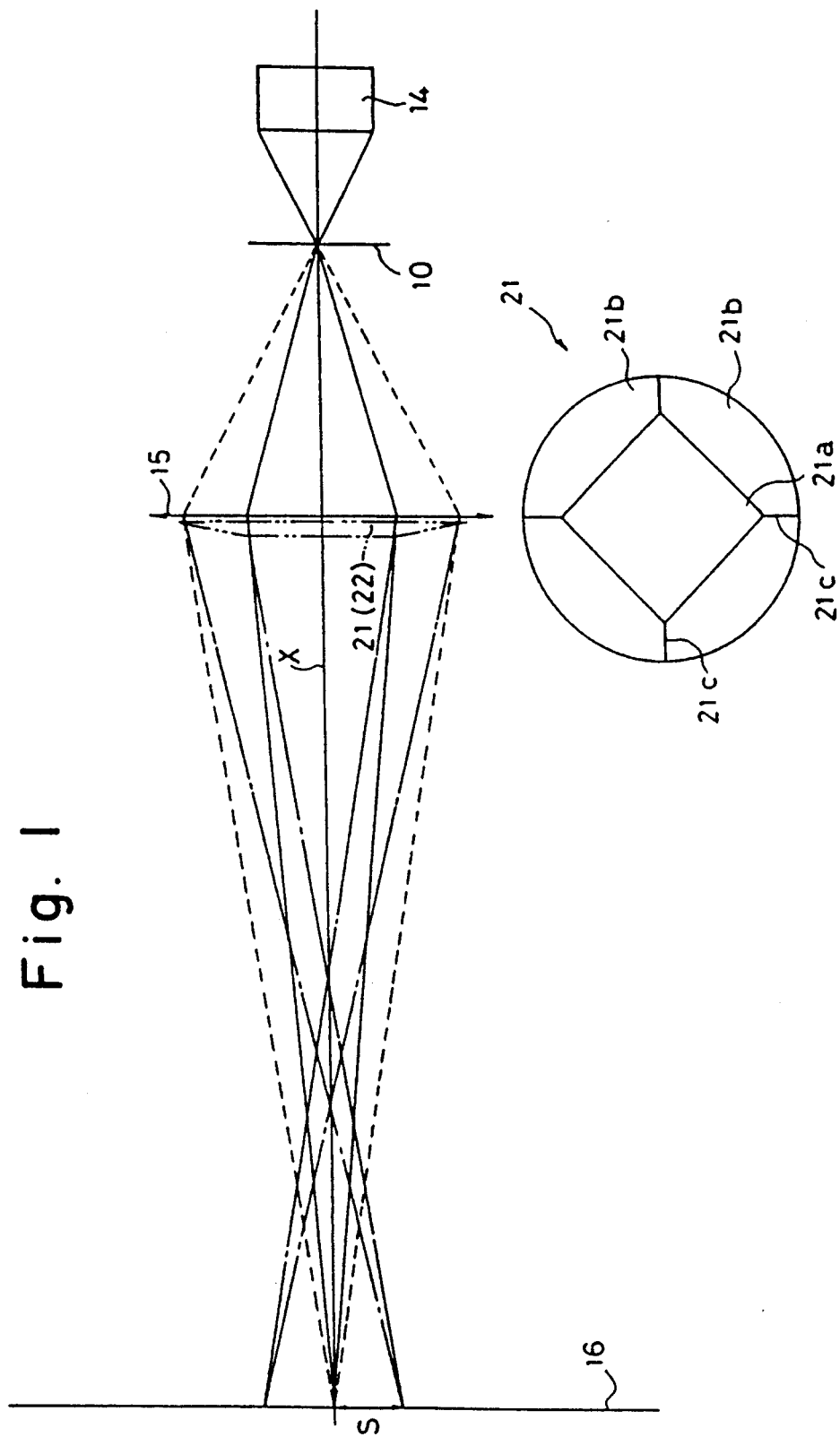
FIG. 1 is an explanatory view of light paths of an apparatus for decreasing the contrast of masks between fine picture elements, according to the present invention.
Figure 18A:
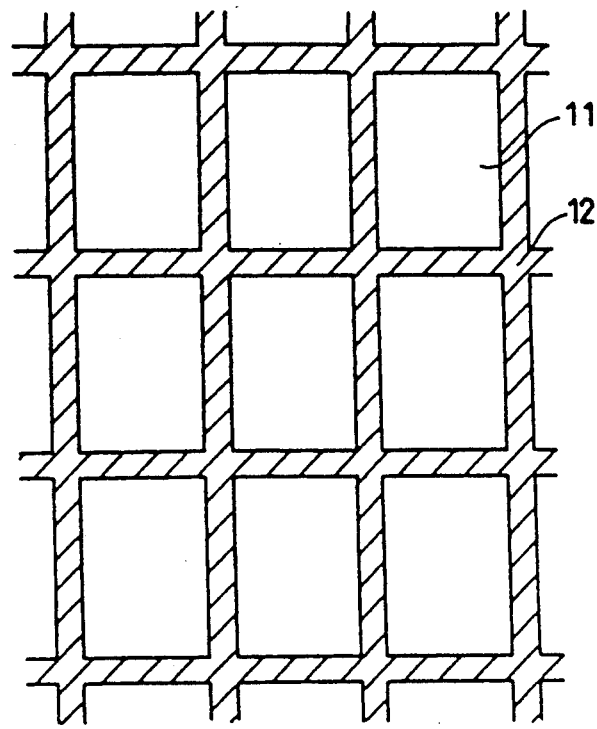
FIG. 18A is an enlarged view of part C in FIG. 18B.
Figure 18B:
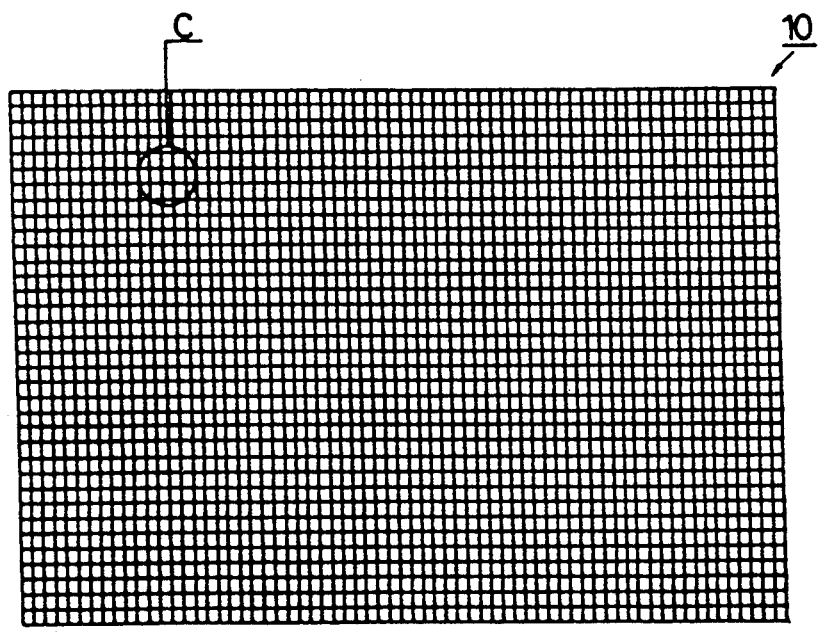
FIG. 18B is a front elevational view of a liquid crystal panel.

FIGS. 18A and 18B show a liquid crystal panel 10 which has fine picture elements 11 in the form of liquid crystals and black masks 12 between the liquid crystals. The liquid crystal panel 10 is located between a light source 14 and a projecting optical system 15, so that an image of the liquid crystal panel 10 which is enlarged by the projecting lens 15 is projected onto a screen (projection plane) 16, as shown in FIG. 1. In case of a single plate type of color LCD, the liquid crystals 11 of the liquid crystal panel 10 are arranged in such a way that three colors of R, G and B are regularly arranged, so that the liquid crystals 11 are selectively projected onto the screen 16 by a switch to make a color picture. In case of a three-plate type of color LCD, liquid crystal panels 10 for R, G and B are located on an optical axis of the projecting optical system 15, so that the images thereof are superimposed and projected onto the screen 16 to make a color picture. The principle of the color LCD mentioned above is per se, well known.

According to the present invention, for example in the projecting optical system of an image formed by the fine picture elements as above constructed, means for dividing and shifting the images is provided in the projecting optical system 15 to decrease the contast of the black masks 12. The dividing and shifting means is composed of, for example a dividing and shifting filter 21, as shown in FIGS. 2A and 2B, or a dividing and shifting filter 22, as shown in FIGS. 3A and 3B.

Figure 2A:
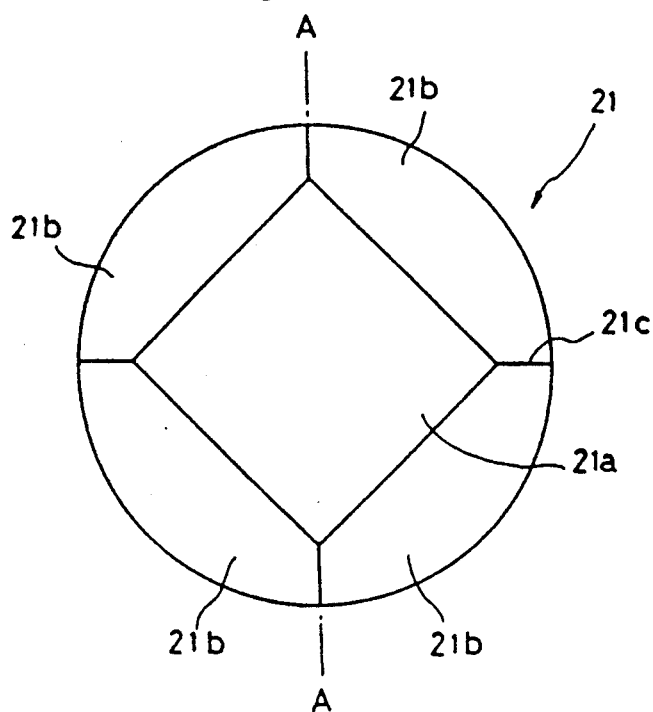
FIG. 2A is a plan view of a dividing and shifting filter, by way of an example.
Figure 2B:
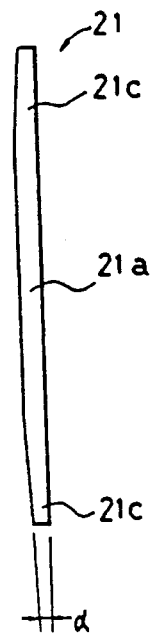
FIG. 2B is a sectional view taken along the line A—A in FIG. 2A.
Figure 3A:
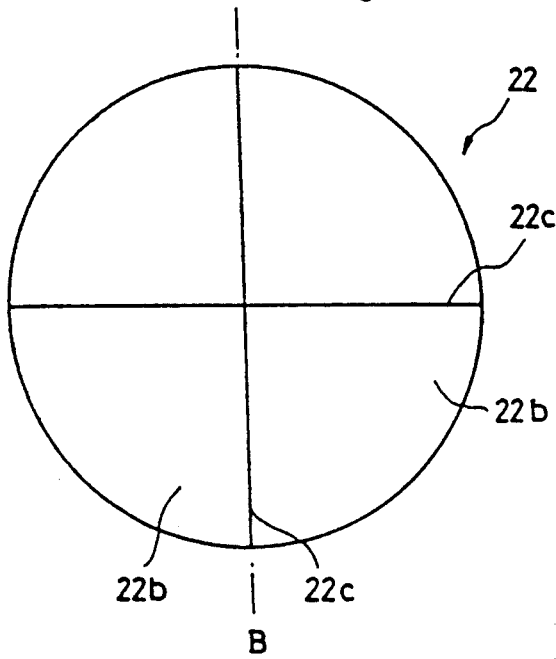
FIG. 3A is a plan view of a dividing and shifting filter according to another embodiment of the present invention.
Figure 3B:
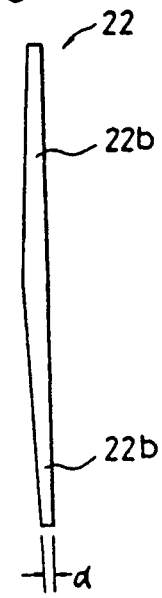
FIG. 3B is a sectional view taken along the line B—B in FIG. 3A.

The dividing and shifting filter 21 shown in FIGS. 2A and 2B has a center square non-shift portion 21a made of a parallel plane glass, and four successive shift portions 21b made of four prisms, located to surround the four sides square of the non-shift portion 21a. The shift portions 21b divide images of the liquid crystals 11 and the black masks 12 of the liquid crystal panel 10 to shift the images in directions forming about 45° angles with respect to the lengthwise and crosswise directions of the black masks 12.

FIG. 1 shows how to make an image on the screen 16 by the non-shift portion 21a and the shift portions 21b. Among the rays of light transmitted through the liquid crystal panel 10 on the optical axis X of the projecting optical system 15, a light component (shown by a solid line) which passes through the non-shift portion 21a is focused onto screen 16 along the optical axis X. On the other hand, a light component (shown by a dotted line) which is transmitted through the shift portions 21b is focused on the screen 16 at a point deviating by a distance S from the optical axis X. The wedge angle $\alpha$ (FIG. 2b) of the shift portions 21b is determined to give a proper deviation S (amount of shift). The directions of shift of the images form about 45° angle with respect to the lengthwise directions and the crosswise directions of the black masks 12. Namely, the separation lines 21c between the shift portions 21b are parallel with the lengthwise and crosswise directions of the black masks 12.

Preferably, the deviation (shift) of the image by the shift portions 21b is within a maximum size of one liquid crystal 11 element. This is because if the deviation exceeds the size of one liquid crystal, no clear image can be formed on the screen 16. More preferably, the deviation (shift) is less than double (two times) the line width of the black masks 12.

FIGS. 5A, 5B and FIGS. 6A, 6B show distributions of the quantity of light when deviation of the image in directions parallel to the lengthwise and crosswise directions is equal to and twice (it should be noted that the deviation is equal to line width $x\sqrt{2}$ in terms of the above-mentioned value S) the line width 1 of the black masks 12, respectively. In these figures, it is assumed that the liquid crystals 11 of the liquid crystal panel 10 are wholly and identically in the state of "light", including the circumference thereof.

Figures 6A, 6B:
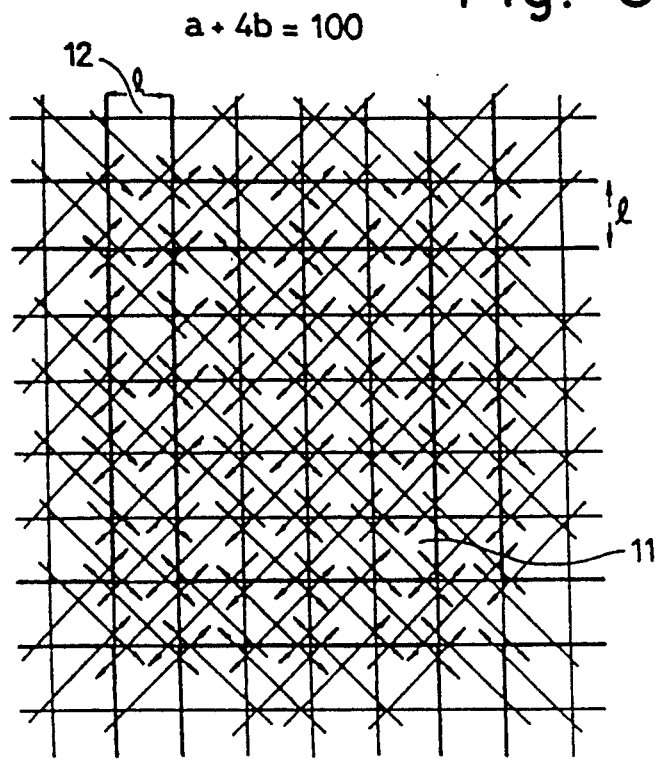
FIG. 6A is a plan view showing the directions and amounts of shift of the divided images, according to another embodiment of the present invention.
FIG. 6B is a plan view showing the distribution of a quantity in the arrangement shown in FIG. 6A.
Figure 5A:
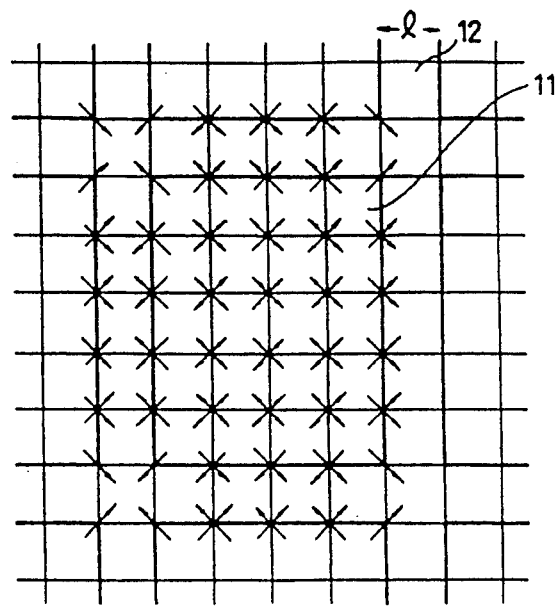
FIG. 5A is a plan view showing the directions and amounts of shift of the divided images.

The arrows in FIGS. 5A and 6A represent both the directions and the amount of shift. "a" and "b" in FIGS. 5B and 6B designate surface areas of the non-shift portion 21a and the shift portions 21b, respectively. It is assumed that the total quantity of light of the dividing and shifting filter 21 is 100. For instance, "a+2b" represents one quantity of light by the non-shift portion 21a and two quantities of light by the shift protions 21b superimposed thereon. the absence of "a" in the black mask portion 12 represents that light transmitted through the non-shift portion 21a does not reach the black mask 12. In other words, only light which is transmitted through the shift portions 21b reaches the black mask 12.

As can be understood from the foregoing, the quantity of light of the black mask 12 and the circumference thereof, which would be "0" if no dividing and shifting filter 21 according to the present invention is provided, is averaged, so that the contrast of the black mask 12 is decreased. Namely, the black mask 12 becomes inconspicuous on the screen 16.

Figure 7A:
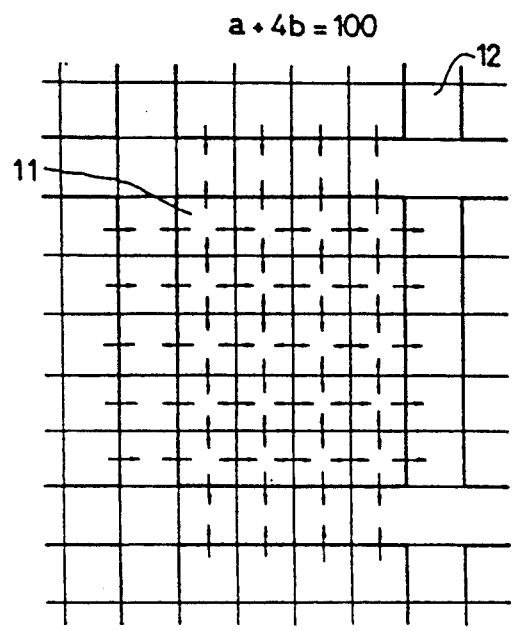
FIG. 7A is a plan view showing the directions and amounts of shift of the divided images, according to still another embodiment of the present invention.
Figure 7B:
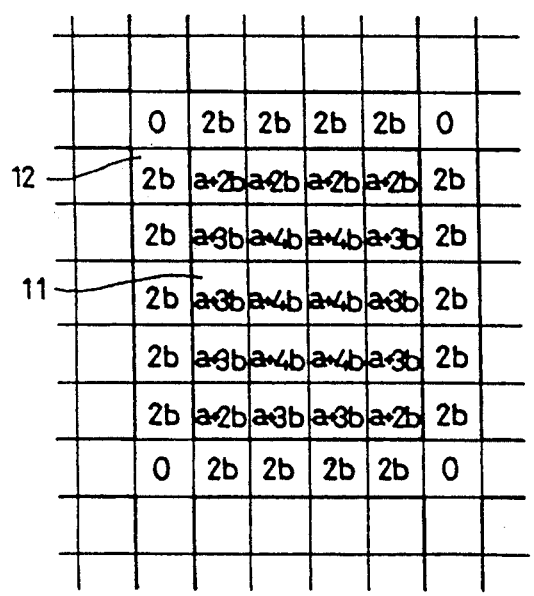
FIG. 7B is a plan view showing the distribution of light quantity in an arrangement shown in FIG. 7A.
Figure 5B:
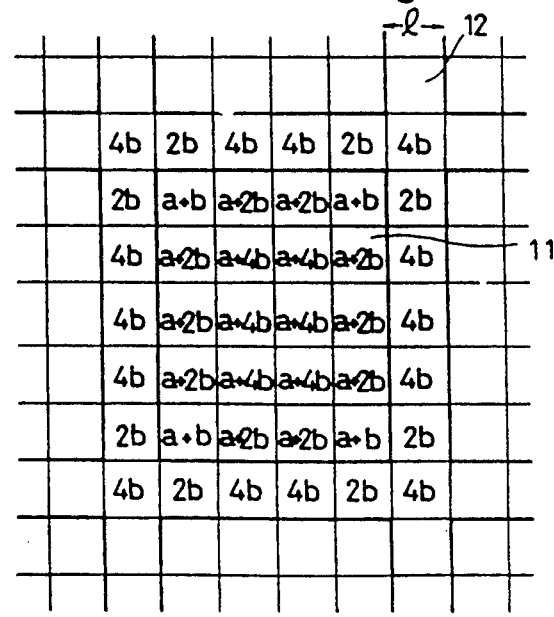
FIG. 5B is a plan view showing the distribution of light quantity in the arrangement shown in FIG. 5A.

FIGS. 7A and 7B show the directions and the amount of shift and the distribution of the quantity of light, when the directions of the shift of the divided images are supposed to be indentical to the lengthwise and crosswise directions of the black stripes 12. In this case, locations at which the quantity of light is "0" exist at the four corners, which are generally considered undesirable. However, the distribution of the quantity of light shown in FIGS. 7A and 7B is practicable, since the surface areas of the corners are very small and have less influence on vision.

The dividing and shifting filter 22 shown in FIGS. 3A and 3B is different from the dividing and shifting filter 21 mentioned above, in that that no center parallel planar portion is provided in the dividing and shifting filter 22. Namely, the dividing and shifting filter 22 has four shifting portions 22b, in the form of prisms in order to form four divided images in directions forming approximately 45° angles with respect to directions of the black masks 12. The separation lines 22c between shift portions 22b are peferably parallel with the lengthwise and crosswise directions of the black masks 12, in a fashion similar the dividing and shifting filter 21. The embodiment illustrated in FIGS. 3A and 3B is equivalent to an embodiment in which the surface area of the central non-shift portion 21a in the dividing and shifting filter 21 is "0".

FIG. 8 shows a distribution of the quantity of light when the images are shifted by a distance corresponding to the line width of the black masks 12, but the dividing and shifting filter 22 shown in FIGS. 3A and 3B, as shown in FIG. 5. The dividing and shifting filter 21 or 22 is located in the projecting optical system 15, preferably at the diaphragm position. The diaphragm position is the smallest diameter position through which rays of light transmitted through the projecting optical system 15 commonly pass. Accordingly, images of the liquid crystals 11 and the black masks 12 are correctly shifted and focused onto the screen 16. All of the liquid crystals 11, and the black stripes 12 of the liquid crystal panel 10, are shifted by the smallest dividing and shifting filter 21 or 22. FIG. 4 shows one example in which the lens system has a diaphragm position located in front of the projecting optical system 15, so that the dividing and shifting filter 21 or 22 is located at the diaphragm position. It goes without saying that the diaphragm position depends on the lens system.

The above discussion has been directed to an ideal case in which the illumination source 14 has a uniform illuminance distribution. In such an ideal distribution, the dividing and shifting filter 21 or 22 has an appropriate number of shift portions, corresponding to the number of division and a non-shift portion if necessary. However, in practice, no light source having a uniform illuminance distribution exists. If the illuminance distribution is not uniform, the distribution of the quantity of light passing through the dividing and shifting filter depends upon the divided images, and, accordingly, no uniform decrease in the contrast of the masks can be effected.

FIGS. 9 through 15 show an embodiment in which the difference in the contrast of the masks, depending on the illuminance of the divided images, does not appear on the screen, on the based upon the assumption that the illuminance of the light source 14 is not uniform. In this embodiment, the dividing and shifting filter 21 or 22 in the above-mentioned embodiment is replaced with a plurality of smaller dividing and shifting filters 21A or 22B, in a matrix arrangement.

Figure 9:
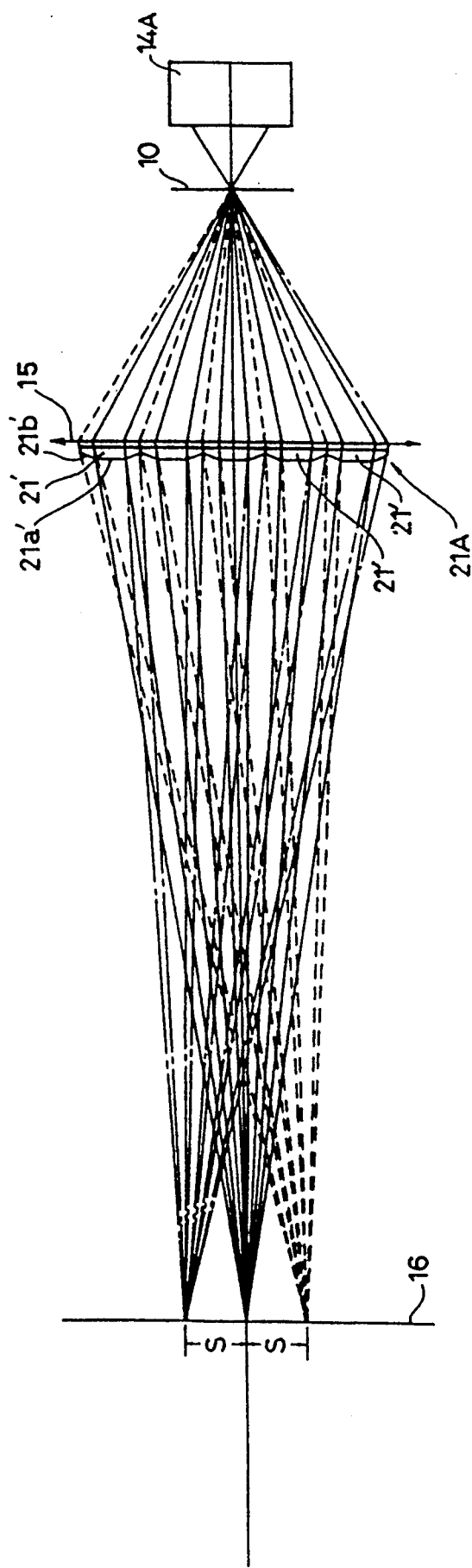
FIG. 9 is an explanatory view in light paths of an apparatus for decreasing the contrast of masks between fine picture elements by a compound dividing and shifting filter, according to another embodiment of the present invention.
Figure 10A:
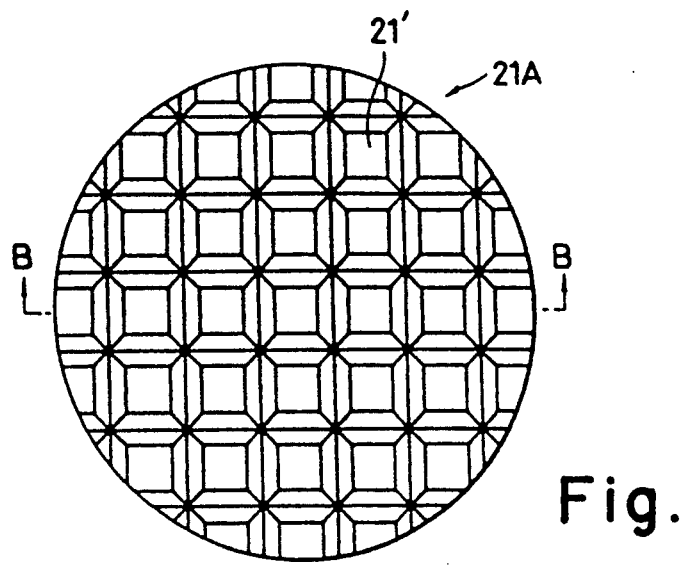
FIG. 10A is a plan view of an embodiment of a compound dividing and shifting filter.
Figure 10B:
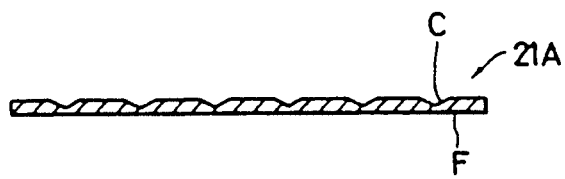
FIGS. 10B and 10C are sectional views taken along the line B—B in FIG. 10A, which show different sectional views respectively.
Figure 10C:
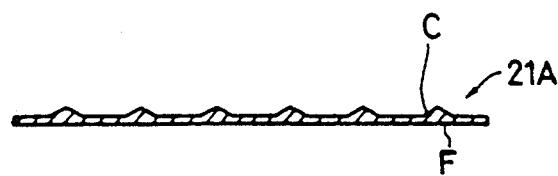
Figure 12A:
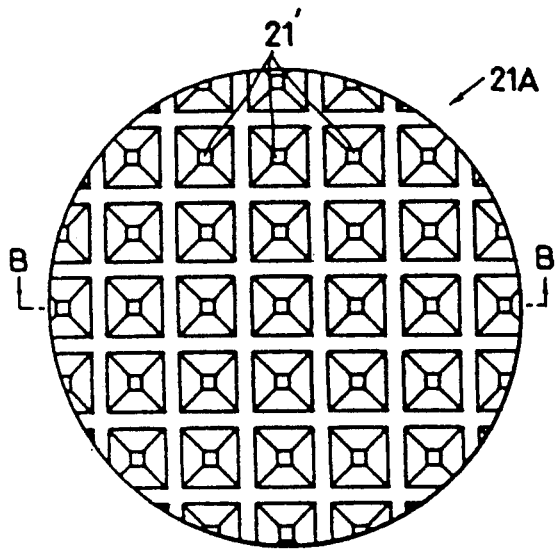
Figure 11A:
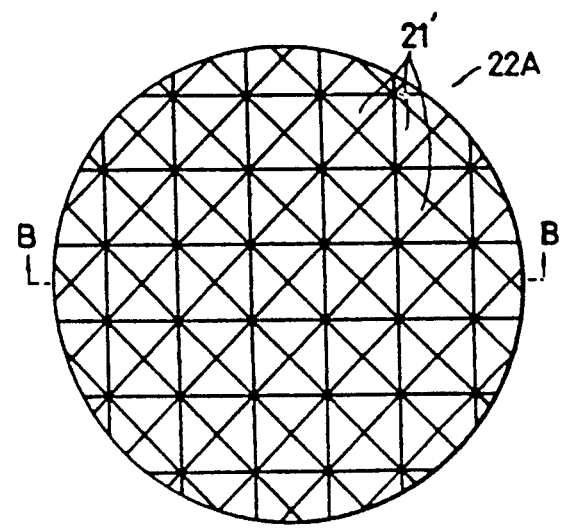
Figure 12B:
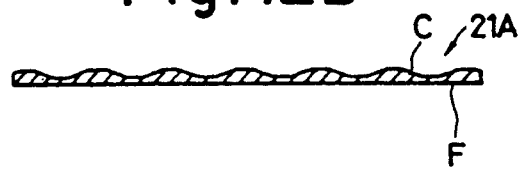
Figure 11B:
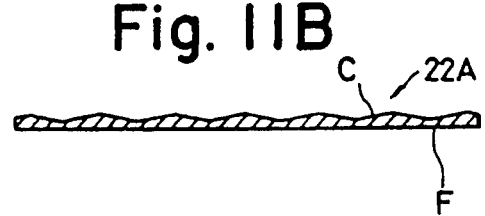
Figure 15A:
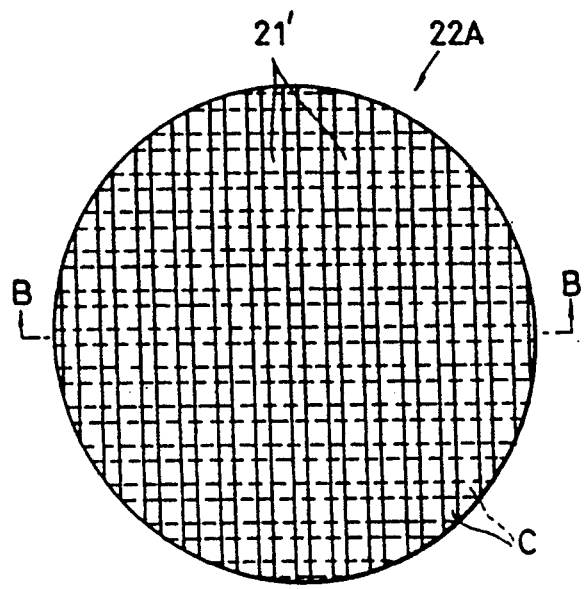
Figure 15B:

In FIG. 9, the compound dividing and shifting filter 21A has an array of five dividing and shifting filter elements 21'. The images of the respective non-shift portions 21a' of the respective dividing and shifting filter elements 21' are formed on the optical axis. The images of the shift portions 21b' are formed on a point which deviates, i.e., is spaced, from the optical axis by a distance S, in both upward and downward directions, and which are superimposed on the images of non-shift portions 21a'. Therefore, even if the illuminance of the light source 14 is not uniform, the difference in illuminance is uniformly dispersed in the all images, so that the difference in illuminance of the light source 14A does not appear on the images as a whole. The compound dividing and shifting filter is applicable not only to the embodiment shown in FIGS. 2A and 2B, but also to the embodiment shown in FIGS. 3A and 3B.

The compound dividing and shifting filter 21A or 22A can be more fully positioned, in comparison with the above-mentioned embodiments. Preferably, the compound dividing and shifting filter 21A or 22A is also located in the vicinity of the diaphragm position of the projecting optical system in order to decrease the size of the whole optical system.

FIGS. 10 through 15 show examples of different shapes of the compound dividing and shifting filter 21A or 22A. FIGS. 10A 11A, 12A, 13A, 14A and 15A are plan views of the compound dividing and shifting filter 21A or 22A. FIGS. 10B, 11B, 12B, 13B, 14B and 15B are sectional views taken along the line B—B of FIGS. 10A~15A. FIG 10C shows another possible elevation of the compound dividing and shifting filter, based on a filter have a plane view as in FIG. 10A and taken along the line B—B in FIG. 10A. The dotted lines shown in FIGS. 14A and 15A connote grooves formed on the lower surface (back surface) of the dividing and shifting filter 21A, similar to those of the upper surface. There is a phase difference of 90° between the grooves of the upper surface and the grooves of the lower surface. In the arrangements shown in FIGS. 10 through 15, the planar portion are non-shift portions and the inclined surface portions are shift portions.

The compound dividing and shifting filter 21A or 22A is mainly classified into two types. In the first type, one of the upper and lower surfaces of the compound dividing and shifting filter 21A or 22A is a plane F and the other surface is provided with a predetermined pattern of inclined surface portions C which serve as a prism, as shown in FIGS. 10, 11, 12, and 13. In the second type, both the upper and lower surfaces are provided with a predetermined pattern of inclined surface portions C perpendicular to each other, as shown in FIGS. 14 and 15.

Figure 16A:
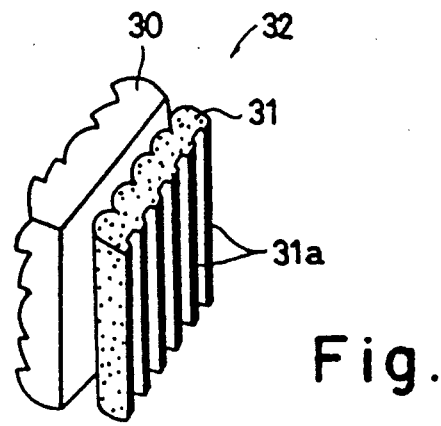
FIG. 16A is a schematic perspective view of a tranmission type screen.
Figure 16B:
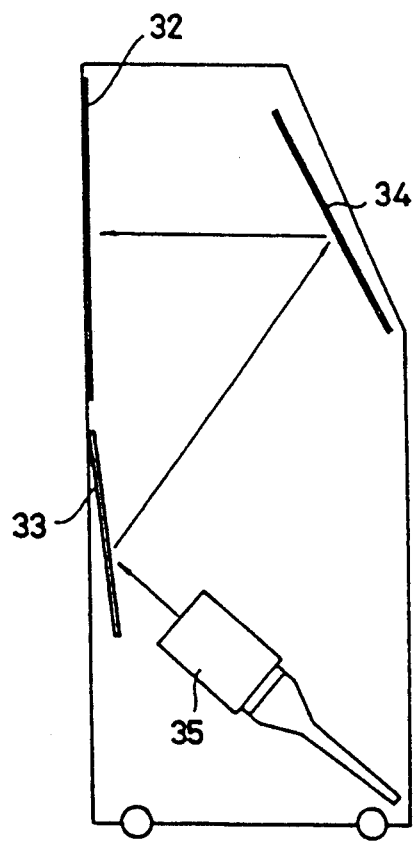
FIG. 16B is a sectional view of a projecting apparatus having a transmission type screen as shown in FIG. 16A.

The contrast decreasing apparatus according to the present invention is advantageously used for a transmission type screen 32 having a Fresnel lens 30 and a lenticular lens 31, in combination, in place of the screen 16 shown in FIG. 1, in order to remove Moire (fringes) as shown in FIGS. 16A and 16B. Namely, in 2 transmission type screen, Moire fringes are produced when the parallel black stripes 31a which are provided on the lenticular lens 31 to increase the contrast of the picture and the black mask of the CRT 35 (or the black mask 12 of the liquid crystal panel 10) are superimposed. However, according to the present invention, since the contrast of the black mask is decreased, no Moire fringe is produced. Note that in FIG. 16B, numerals 33 and 34 designate mirrors.

Figure 17:
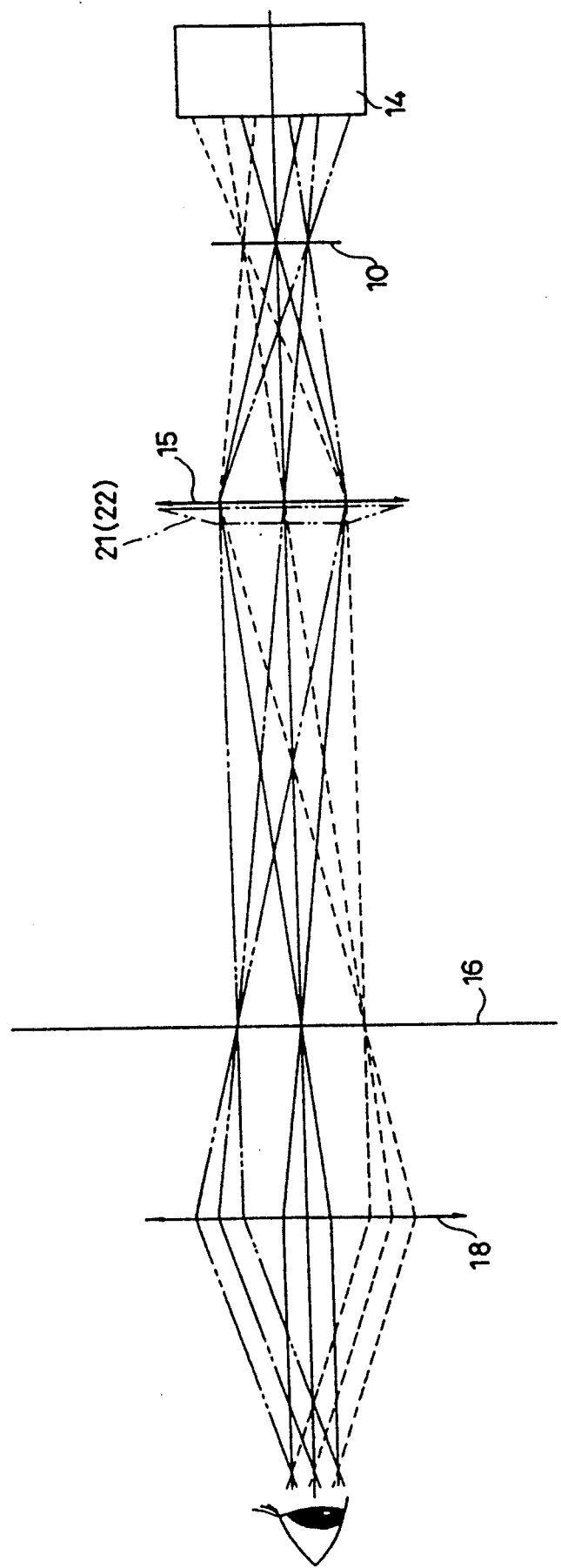
FIG. 17 is a view of the light paths in a viewing optical system to which the present invention is applied.

Although the above mentioned embodiments are directed to the projecting optical system, the present invention can be applied to a viewing optical system for viewing an aerial image or a viewing optical system for directly viewing images formed by fine picture elements. Namely, as can be seen from FIG. 17, a pupil of the projecting optical system is focused onto a pupil of one of the eyes of a viewer by an eyepiece lens system 18 to have a conjugate relationship therebetween. In case of an array of fine picture elements by an optical fiber, the optical fiber is located at a position in which the liquid crystal panel 10 shown in FIG. 17 is located.

The number of divisions of the dividing and shifting filter 21 or 22, or the compound dividing and shifting filter 21A or 22A, is preferably four (i.e. five, if the center non-shift portion is included) in case of rectangular fine picture elements, as mentioned before. On the other hand, in case of circular fine picture elements, such as optical fibers, the number of divisions can be three or more. The directions and the amount of shift can be determined so as to decrease the contrast of the masks as a whole, in accordance with the positional relationship between the fine picture elements and the masks.

As can be understood from the foregoing, according to the present invention, the contrast of the non-emission portions existing between the fine picture elements can be decreased by the division and the shift of the images without defocusing the images. Furthermore, according to the present invention, the division and shift of the images can be easily effected by a filter member.

We claim:

1. An image forming optical system in which an image is formed by arrays of fine pictures elements, and which has non-emmision portions between the picture elements which do not contribute to the formation of an image, a contrast decreasing apparatus comprising means for dividing images of the respective picture elements, or a whole image formed by the picture elements, into a plurality of images and for shifting the divided images by a distance less than the size of one picture element, to be projected onto a projection plane of an image or onto an image plane of the aerial image.

2. A contrast decreasing apparatus according to claim 1, wherein said image forming optical system is of a type in which the transmission images of the fine picture element arrays are projected onto a projection plane through a projecting optical system.

3. A contrast decreasing apparatus according to claim 1, wherein said dividing and shifting means comprises a dividing and shifting filter having a plurality of prisms.

4. A contrast decreasing apparatus according to claim 1, wherein said dividing and shifting means comprises a compound dividing and shifting filter having dividing and shifting filter elements with prisms in a matrix arrangement.

5. A contrast decreasing apparatus according to claim 3, wherein said dividing and shifting filter is located at a diaphragm position of the projecting optical system in or the vicinity thereof.

6. A contrast decreasing apparatus according to claim 4, wherein said compound dividing and shifting filter is located at a diaphragm position of the projecting optical system or in the vicintiy thereof.

7. A contrast decreasing apparatus according to claim 4, wherein said compound dividing and shifting filter has opposite surfaces, one of which is planar and the other surface being provided with a predetermined pattern of inclined surface portions serving as a prism.

8. A contrast decreasing apparatus according to claim 4, wherein said compound dividing and shifting filter has opposite surfaces which are provided with predetermined patterns of inclined surfaces portions perpendicular to each other.

9. A contrast decreasing apparatus according to claim 1, wherein said fine picture elements are positioned between the masks located in a matrix arrangement, so that the dividing and shifting means divides the image into images and shifts the divided images, in at least four directions forming about 45° angles with respect to the lengthwise and widthwise directions of the masks.

10. A contrast decreasing apparatus according to claim 7, wherein said fine picture elements positioned between the masks located in a matrix arrangement are in the form of liquid crystals.

11. A contrast decreasing apparatus according to claim 10, wherein said dividing and shifting means divides the image into five images, four of which are shifted in four directions forming angels of about 45° with respect to the lengthwise and crosswise directions of the masks, and the remaining one center image is not shifted.

12. A contrast decreasing apparatus according to claim 1, wherein said image forming optical system is of a type in which aerial images of the fine picture elements are viewed through an ocular optical system.

13. A contrast decreasing apparatus according to claim 12, wherein said aerial images are formed by a projecting optical system in which the dividing and shifting means is arranged.

14. In an image forming optical system in which an image is formed by arrays of fine picture elements and which has non-emission portions which do not contribute to a formation of an image between the picture elements, so that the images are viewed through a viewing optical system, a contrast decreasing apparatus comprising means in the viewing optical system for dividing images of the respective picture elements or a whole image formed by the picture elements into more than two images and for shifting the divided images by a distance within a size of one picture element.

15. A contrast decreasing apparatus according to claim 14, wherein said fine picture elements are circular.

16. A contrast decreasing apparatus according to claim 15, wherein said fine picture element are optical fibers.

17. In an image forming optical system in which images are formed by arrays of fine picture elements which are provided between non-emission portions, so that the images are projected through a projecting optical system, a contrast decreasing apparatus comprising means for dividing images of the respective picture elements or a whole image formed by the picture elements into a plurality of images in different directions.

18. A contrast decreasing apparatus comprising an image forming means having arrays of fine pictures elements which are provided between non-emission masks located in a matrix arrangement, a projecting optical device which projects the image formed by the image forming means, and an image dividing and shifting means in the projecting optical device for dividing images of respective picture elements or a whole image formed by the picture elements into a plurality of images in different directions.

19. A contrast decreasing apparatus according to claim 18, wherein said image dividing and shifting means comprises a dividing and shifting filter having a plurality of prisms.

20. A contrast decreasing apparatus according to claim 19, wherein said image dividing and shifting means comprises a compound dividing and shifting filter having dividing and shifting filter elements with prisms in a matrix arrangement.

21. A contrast decreasing apparatus according to claim 20, wherein said dividing and shifting means divides the image into images and shifts the divided images in at least four directions forming bout 45° with respect to the lengthwise and crosswise directions of the masks.

22. A contrast decreasing apparatus according to claim 20, wherein said dividing and shifting means divides the image into five images, four of which are shifted in four directions forming angles of about 45° with respect to the lengthwise and crosswise directions of the masks, and the remaining one center image being not shifted.

23. A contrast decreasing apparatus according to claim 20, wherein the amount of shift of the images carried out by the dividing and shifting means is substantially identical to a line width of the masks located in a matrix arrangement.

24. A contrast decreasing apparatus according to claim 20, wherein the amount of shift of the images carried out by the dividing and shifting means is substantially identical to twice a line width of the masks located in a matrix arrangement.

* * * * *

UNITED STATES PATENT AND TRADEMARK OFFICE
CERTIFICATE OF CORRECTION

PATENT NO. : 5,005,968

DATED : April 9, 1991

INVENTOR(S) : Y. TEJIMA et al.

It is certified that error appears in the above-identified patent and that said Letters Patent is hereby corrected as shown below:

At column 1, line 12, after "precisely" insert ---it relates---.
At column 1, line 18, change "emissin" to ---emission---.
At column 1, line 29, change "ocula" to ---ocular---.
At column 1, line 60, after "of" insert ---an---.
At column 2, line 4, change "If" to ---In---.
At column 2, line 7, change "image" to ---images---.
At column 2, line 10, change "on" to ---or---.
At column 2, line 12, delete ",".
At column 2, line 13, delete ",".
At column 2, line 19, after "system" insert ---,---.
At column 2, line 39, change "lenghthwise" to ---lengthwise---.
At column 2, line 40, after "accordingly" insert ---,---.
At column 2, line 53, after "masks" insert ---,---.
At column 3, line 1, change "array" to ---arrays---.
At column 3, line 3, change "wil" to ---will---.
At column 3, line 30, delete "a" (2nd occurrence).
At column 3, line 31, before "quantity" insert ---light---.
At column 3, lines 49-50, change ", which show different sectional views respectively;" to ---of different compound dividing and shifting filters that each have the same plan view shown in Fig. 10A but which have elevational views;---.
At column 4, line 22, after "is" insert ---,---.
At column 4, line 27, change "contast" to ---contrast---.
At column 4, line 52, change "on" to ---onto---.
At column 4, line 57, delete "direction" (first occurrence).

UNITED STATES PATENT AND TRADEMARK OFFICE
CERTIFICATE OF CORRECTION

PATENT NO. : 5,005,968
DATED : April 9, 1991
INVENTOR(S) : Y.Tejima et al It is certified that error appears in the above-identified patent and that said Letters Patent is hereby corrected as shown below:

Column 5, line 6, change "1" to ---1---.

Column 5, line 19, change "the" to --THE--.

Column 5, line 35, change "identical" to --identical --.

Column 5, line 52, change "preferabley" to --preferably --.

Column 5, line 54, after "similar" insert --to--.

Column 5, line 60, after "shifted" insert --,--.

Column 5, line 61, change "but" to --by --.

Column 5, line 65, change "the" (first occurrence) to --a--.

Column 6, line 27, change "on the" to --these figures are --.

Column 6, line 32, change "22B" to --22A --.

Column 7, line 5, change "portion" to --portions --.

Column 7, line 23, change "2" to --a --.

Column 7, line 47, after "i.e." insert --,--.

Column 7, line 66, (claim 1, line 1), change "1. An" to --1. In an --.

Column 7, line 68 (claim 1, line 3), change "non-emmission" to --non-emmission--.

Column 8, line 5 (claim 1,line 8), after "images" insert --,--.

Column 8, line 8 (claim 1, line 11), after "images" insert --, --.

Column 8, line 24, (claim 5, line 3), delete "in".

Column 8, line 25, (claim 5, line 4), after "or" insert --in --.

Column 8, line 29 (claim 6, line 4), change "vicintiy" to --vicinity --.

UNITED STATES PATENT AND TRADEMARK OFFICE
CERTIFICATE OF CORRECTION

PATENT NO. : 5,005,968

DATED : April 9, 1991

INVENTOR(S) : Y. TEJIMA et al.

It is certified that error appears in the above-identified patent and that said Letters Patent is hereby corrected as shown below:

At column 8, line 38 (claim 8, line 4), change "surfaces" to ---surface---.

At column 8, line 48 (claim 10, line 2), change "7" to ---9---.

At column 8, line 54 (claim 11, line 4), change "angels" to ---angles---.

At column 9, line 25 (claim 18, line 2), change "pictures" to ---picture---.

At column 9, line 28 (claim 18, line 5), change "image" to ---images---.

At column 9, line 31 (claim 18, line 8), after "of" insert ---the---.

Signed and Sealed this

Third Day of August, 1993

*Attest:*

MICHAEL K. KIRK

*Attesting Officer*    Acting Commissioner of Patents and Trademarks

UNITED STATES PATENT AND TRADEMARK OFFICE
CERTIFICATE OF CORRECTION

PATENT NO. : 5,005,968

DATED : April 9, 1991

INVENTOR(S) : Y. Tejima, et. al.

It is certified that error appears in the above-identified patent and that said Letters Patent is hereby corrected as shown below:

On the Title page, item [73] Assignee: after "Kaisha" delete "," and insert --; Casio Computer Co., Ltd., all of --.

Signed and Sealed this

Ninth Day of August, 1994

*Attest:*

BRUCE LEHMAN

*Attesting Officer*      *Commissioner of Patents and Trademarks*